(12) United States Patent
Ishida et al.

(10) Patent No.: US 11,509,015 B2
(45) Date of Patent: Nov. 22, 2022

(54) ENERGY STORAGE MODULE AND ENERGY STORAGE DEVICE

(71) Applicants: Robert Bosch GmbH, Stuttgart (DE); GS Yuasa International Ltd., Kyoto (JP)

(72) Inventors: Yoshitaka Ishida, Kyoto (JP); Hiroshi Mukai, Kyoto (JP); Kazuya Okabe, Kyoto (JP); Koichi Nishiyama, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 36 days.

(21) Appl. No.: 16/635,917

(22) PCT Filed: Aug. 6, 2018

(86) PCT No.: PCT/JP2018/029455
§ 371 (c)(1),
(2) Date: Jan. 31, 2020

(87) PCT Pub. No.: WO2019/031457
PCT Pub. Date: Feb. 14, 2019

(65) Prior Publication Data
US 2020/0235358 A1    Jul. 23, 2020

(30) Foreign Application Priority Data
Aug. 8, 2017   (JP) .............................. JP2017-152868

(51) Int. Cl.
     *H01M 10/613*    (2014.01)
     *H01M 50/24*    (2021.01)
     (Continued)

(52) U.S. Cl.
     CPC .............. *H01M 50/24* (2021.01); *H01G 9/08* (2013.01); *H01M 50/20* (2021.01);
     (Continued)

(58) Field of Classification Search
     CPC ........ H01G 11/10; H01G 11/18; H01G 11/78; H01G 9/08; H01M 10/613; H01M 10/625;
     (Continued)

(56) References Cited

U.S. PATENT DOCUMENTS 4,323,620 A *   4/1982   Iwabuchi ................. B32B 7/02
                                                            428/432
4,606,982 A *   8/1986   Nelson ................ H01M 10/342
                                                            429/246
(Continued)

FOREIGN PATENT DOCUMENTS

| CN | 101494278 A | 7/2009 |
|---|---|---|
| JP | S56-109274 U | 8/1981 |

(Continued)

OTHER PUBLICATIONS

Machine Translation JP2012124319A (Year: 2012).*
(Continued)

*Primary Examiner* — Victoria H Lynch
(74) *Attorney, Agent, or Firm* — McGinn I.P. Law Group, PLLC.

(57) ABSTRACT

An energy storage module according to an aspect of the present invention includes: a plurality of energy storage devices each including a case; a glass paper sheet provided between the energy storage devices, brought into contact with the case, and mainly composed of a glass fiber; and a holding member holding the plurality of energy storage devices and the glass paper sheet, wherein the glass paper sheet is compressed between the energy storage devices.

14 Claims, 4 Drawing Sheets

(51) Int. Cl.
*H01G 9/08* (2006.01)
*H01M 50/20* (2021.01)
*H01M 50/44* (2021.01)
*H01M 50/431* (2021.01)

(52) U.S. Cl.
CPC ......... *H01M 50/431* (2021.01); *H01M 50/44* (2021.01); *H01M 2220/20* (2013.01)

(58) Field of Classification Search
CPC ............. H01M 10/647; H01M 10/651; H01M 10/6568; H01M 10/658; H01M 2220/20; H01M 50/10; H01M 50/103; H01M 50/116; H01M 50/124; H01M 50/1245; H01M 50/20; H01M 50/24; H01M 50/431; H01M 50/44; Y02E 60/10
See application file for complete search history.

(56) References Cited

U.S. PATENT DOCUMENTS

| | | |
|---|---|---|
| 5,051,322 A | 9/1991 | Hasenauer |
| 2002/0053465 A1* | 5/2002 | Kawakita ............. H05K 3/4655 174/256 |
| 2009/0186270 A1 | 7/2009 | Harada et al. |
| 2015/0280193 A1 | 10/2015 | Ohshiba et al. |
| 2016/0260978 A1* | 9/2016 | Fujii ..................... H01M 4/625 |
| 2017/0301965 A1 | 10/2017 | Kato et al. |

FOREIGN PATENT DOCUMENTS

| | | |
|---|---|---|
| JP | S62-15773 A | 1/1987 |
| JP | H10-040952 A | 2/1998 |
| JP | 2004-362879 | 12/2004 |
| JP | 2010-267555 | 11/2010 |
| JP | 2012-124319 A | 6/2012 |
| JP | 2013-113408 A | 6/2013 |
| JP | 2015-002082 A | 1/2015 |
| JP | 2015-195149 A | 11/2015 |
| JP | 2016-084836 A | 5/2016 |
| KR | 10-0995544 B1 | 11/2010 |
| WO | WO 2018/003478 A1 | 1/2018 |
| WO | WO 2018/110055 A1 | 6/2018 |

OTHER PUBLICATIONS

Machine Translation JP2013113408A (Year: 2013).*
International Search Report (ISR) (PCT Form PCT/ISA/210), in PCT/JP2018/029455, dated Oct. 9, 2018.

* cited by examiner

ENERGY STORAGE MODULE AND ENERGY STORAGE DEVICE

TECHNICAL FIELD

The present invention relates to an energy storage module and an energy storage device.

BACKGROUND ART

A chargeable/dischargeable energy storage device is used in various devices such as a mobile phone and an automobile. A vehicle powered by electric energy such as an electric vehicle (EV) and a plug-in hybrid electric vehicle (PHEV) requires considerable energy, and therefore is equipped with a large-capacity storage module including a plurality of energy storage devices.

When the temperature of any one of the energy storage devices is excessively increased from any cause, which is not a normal use state, in such an energy storage module, the heat of the energy storage device is conducted to heat the adjacent energy storage device. Thus, when the active material of the electrode of the adjacent energy storage device is heated to a temperature equal to or higher than the self-heating temperature, the adjacent energy storage device also generates heat, and heats a further adjacent energy storage device, so that a large number of energy storage devices may generate heat in a chain reaction.

When an energy storage device in which a metal case is covered with a resin film is used, and the energy storage device generates heat, the resin film is melted and adjacent metal cases are brought into contact with each other, so that the chain of heat generation is apt to occur.

Japanese Patent Laying-Open No. 2015-195149 discloses a technique for suppressing the conduction of heat of an energy storage device to an adjacent energy storage device. In this technique, the conduction of heat between the energy storage devices is suppressed by a partition member formed of mica integrated material.

PRIOR ART DOCUMENT

Patent Document

Patent Document 1: JP-A-2015-195149

SUMMARY OF THE INVENTION

Problems to be Solved by the Invention

The energy storage module described in the above publication has room for improvement from the viewpoint of an energy density.

An object of the present invention is to provide an energy storage module having a high energy density and capable of preventing the chain of heat generation between energy storage devices, and an energy storage device which is a main component of the energy storage module.

Means for Solving the Problems

In a conventional energy storage module, heat insulation is provided by providing an air layer of about 10 mm or a partition member (for example, mica integrated material) having a thickness of about several mm between a plurality of energy storage devices. Recently, further increases in the capacities of the energy storage device and energy storage module and a further increase in the energy density (for example, an amount charged per unit volume) are desired.

When the capacity and energy density of each energy storage device are increased, and a certain energy storage device generates heat, energy and heat released from the energy storage device are also large. By increasing the thicknesses of the air layer and partition member between the energy storage devices, the heat insulating properties can be improved, but these techniques decrease the energy density of the storage module. Therefore, a new measure which can prevent the chain of heat generation without lowering the energy density is required.

An energy storage module according to an aspect of the present invention includes: a plurality of energy storage devices each including a case; a glass paper sheet provided between the energy storage devices, brought into contact with the case, and mainly composed of a glass fiber; and a holding member holding the plurality of energy storage devices and the glass paper sheet, wherein the glass paper sheet is compressed between the energy storage devices.

Advantages of the Invention

The energy storage module according to an aspect of the present invention includes the glass paper sheet, whereby the chain of heat generation can be prevented.

MODE FOR CARRYING OUT THE INVENTION

Figure 1:
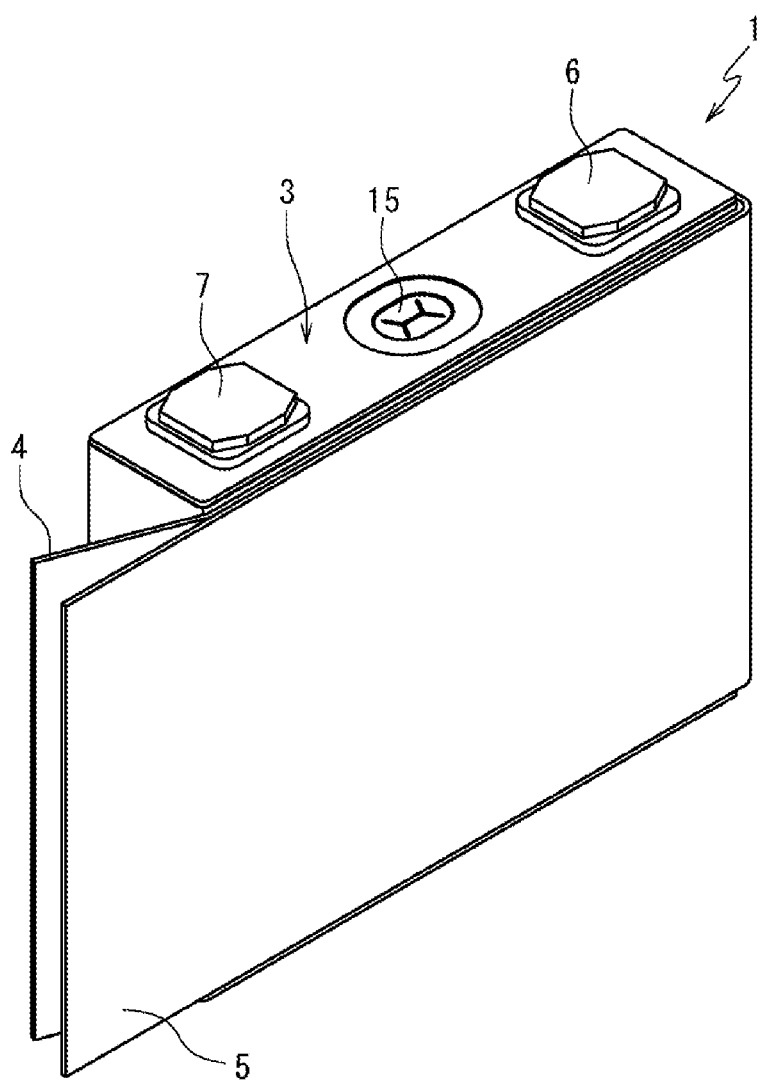
FIG. 1 is a schematic perspective view showing an energy storage device according to one embodiment of the present invention.

An energy storage module according to an aspect of the present invention includes: a plurality of energy storage devices each including a case; a glass paper sheet provided between the energy storage devices, brought into contact with the case, and mainly composed of a glass fiber; and a holding member holding the plurality of energy storage devices and the glass paper sheet, wherein the glass paper sheet is compressed between the energy storage devices.

The energy storage module according to one embodiment of the present invention includes the glass paper sheet mainly composed of a glass fiber, whereby, when the energy storage device generates heat from any cause, the glass paper sheet exhibits a heat insulating effect. Therefore, the conduction of heat to an adjacent energy storage device can be suppressed, to prevent the chain of heat generation. The energy storage module may be assembled in a state where a plurality of energy storage devices are compressed in order to prevent the case of each energy storage device from expanding with use. Even in such a case, the glass paper sheet has predetermined rigidity, whereby a heat conduction suppressing effect can be maintained by securing a void between the energy storage devices.

It is preferable that the case have a short side surface and a long side surface which is orthogonal to the short side surface and have an area larger than that of the short side surface; and the glass paper sheet be brought into contact with at least the long side surface. The long side surface means, for example, a wall surface having the largest area among wall surfaces of a prismatic case. The glass paper sheet is brought into contact with at least the long side surface, whereby the conduction of heat to an adjacent energy storage device can be effectively suppressed.

Preferably, the glass paper sheet covers the case over the short side surface and the long side surface. The glass paper sheet covers the case over the short side surface and the long side surface, whereby the heat conduction suppressing effect can be improved.

It is preferable that the glass paper sheet have an average thickness of 0.2 mm or more and 1.0 mm or less. The average thickness of the glass paper sheet is within the above range, whereby a sufficient heat conduction suppressing effect can be provided while the distance between the energy storage devices in the energy storage module is narrowed to increase the energy density.

The glass paper sheet preferably has a porosity of 70% or more and 97% or less. The porosity of the glass paper sheet is within the above range, whereby sufficient strength and heat insulating properties of the glass paper sheet can be secured.

It is preferable that the glass paper sheet have a porosity of 45% or more and 80% or less under a pressure of 20 $N/cm^2$ applied to the energy storage device. Normally, when the energy storage device is assembled into the energy storage module, a compression force is applied to the energy storage devices and the glass paper sheet sandwiched between the energy storage devices by an end plate or the like of the module. The porosity of the glass paper sheet is within the above range under a pressure of 20 $N/cm^2$, which makes it possible to secure sufficient strength and heat insulating properties of the glass paper sheet in a state where the glass paper sheet is assembled into the energy storage module.

It is preferable that the energy storage module further include a resin film brought into contact with the glass paper sheet. The energy storage module further includes a resin film brought into contact with the glass paper sheet, whereby the strength of the glass paper sheet and the insulation between the cases can be ensured.

An energy storage device according to another aspect of the present invention includes: a case; and a glass paper sheet brought into contact with the case and mainly composed of a glass fiber, wherein the glass paper sheet has a porosity of 70% or more and 97% or less.

When the energy storage device according to another embodiment of the present invention is assembled into the energy storage module, the conduction of heat to an adjacent energy storage device can be suppressed by the glass paper sheet to prevent the chain of heat generation. The porosity of the glass paper sheet is within the above range, whereby sufficient strength and heat insulating properties of the glass paper sheet can be secured.

Hereinafter, embodiments of the present invention will be described in detail with reference to the drawings as appropriate.

Figure 2:
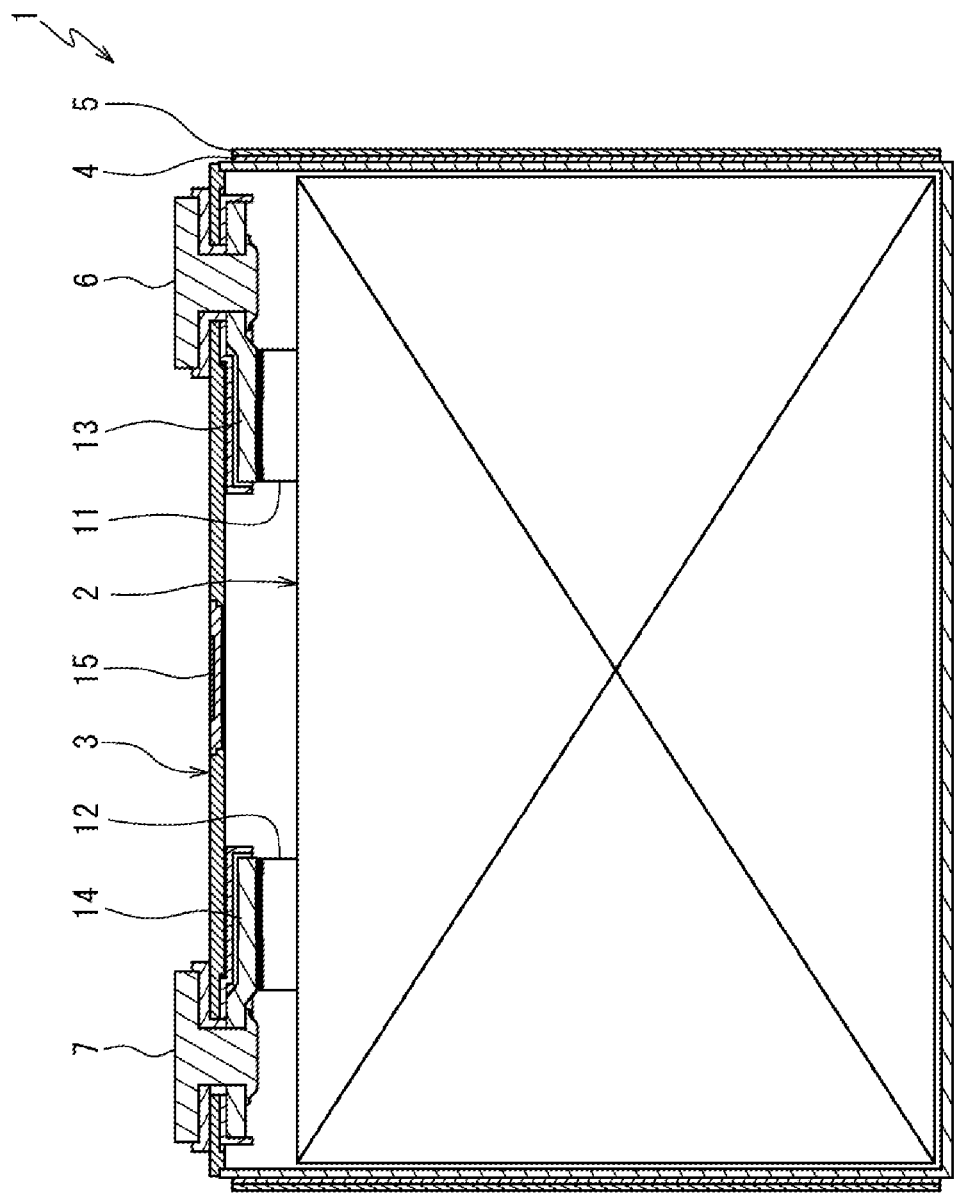
FIG. 2 is a schematic cross-sectional view cut in parallel to a long side surface of the energy storage device of FIG. 1.
Figure 3:
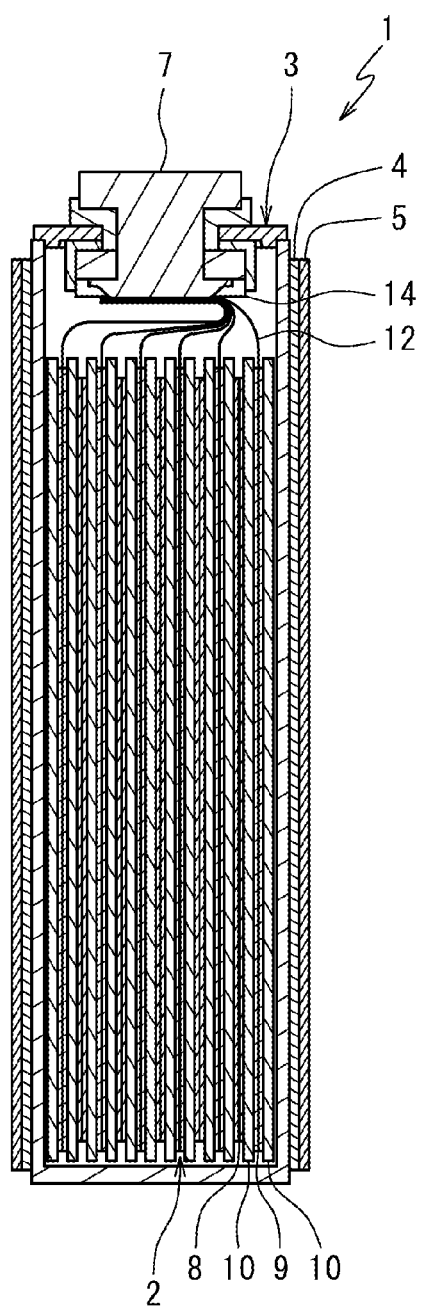
FIG. 3 is a schematic cross-sectional view cut parallel to a short side surface of the energy storage device of FIG. 1.

FIGS. 1 to 3 show an energy storage device 1 according to one embodiment of the present invention. The energy storage device 1 includes an electrode assembly 2, a case 3 for housing the electrode assembly 2, a glass paper sheet 4 provided on an outer surface of the case 3 and mainly composed of a glass fiber, and a resin film 5 laminated on an outer surface of the glass paper sheet 4. In the case 3, an electrolyte solution is sealed together with the electrode assembly 2.

The case 3 may have a prismatic shape, and have a rectangular bottom surface, a rectangular top surface opposed to the bottom surface, a pair of rectangular short side surfaces, and a pair of long side surfaces which have a rectangular shape, are orthogonal to the pair of short side surfaces and have an area larger than that of each of the short side surfaces. The glass paper sheet 4 is preferably provided to cover the pair of long side surfaces. The glass paper sheet 4 may be provided so as to cover one short side surface and one long side surface, or may be provided so as to cover a pair of short side surfaces and one long side surface. The glass paper sheet 4 is preferably provided on the case 3 over the pair of short side surfaces and the pair of long side surfaces, that is, provided so as to cover all four side surfaces of the case 3 (so as to cover the entire circumference).

The energy storage device 1 includes a pair of external terminals (positive external terminal 6 and negative external terminal 7) for electrically connecting the electrode assembly 2 to an external circuit. The external terminals 6 and 7 are provided so as to penetrate the top surface of the case 3.

In the energy storage device 1, members such as an insulating film, a cushion sheet, and a spacer may be appropriately disposed between the electrode assembly 2 and the case 3.

The energy storage device 1 includes the glass paper sheet 4 mainly composed of a glass fiber on the outer surface of the case 3 housing the electrode assembly 2. Therefore, even when the plurality of energy storage devices 1 are used in a state where the energy storage devices are disposed side by side, and heat is generated from any cause, which is not a normal use state, the glass paper sheet 4 exhibits a heat insulating effect, whereby the conduction of heat to the adjacent energy storage device 1 can be suppressed. Thus, the chain of heat generation can be prevented.

The glass paper sheet 4 has a low thermal conductivity due to the inclusion of air between the glass fibers, whereby a high heat insulating effect can be exhibited without the external dimension of the energy storage device 1 being largely increased. Therefore, the energy densities of the energy storage device 1 and the energy storage module (described later) including the plurality of energy storage devices 1 can be improved.

Hereinafter, each component of the energy storage device 1 will be described in detail.

As the electrode assembly 2, a wound electrode assembly may be used, or a laminated electrode assembly which can further increase the energy density as illustrated may be used.

The laminated electrode assembly 2 includes a plurality of laminated rectangular plate-shaped positive electrode plates 8, negative electrode plates 9, and separators 10, and a positive electrode tab 11 and a negative electrode tab 12 extending from the positive electrode plate 8 and the negative electrode plate 9 toward the top surface of the case 3.

More specifically, the electrode assembly 2 includes a main body in which the plurality of positive electrode plates 8 and negative electrode plates 9 are alternately laminated with a separator 10 interposed therebetween to form a substantially rectangular parallelepiped shape, and the positive electrode tab 11 and the negative electrode tab 12 extending from the main body. The number of the laminated positive electrode plates 8 may be, for example, 40 to 60 in order to increase the capacity of the energy storage device 1. The same may apply to the number of the negative electrode plates 9.

The positive electrode tab 11 of the electrode assembly 2 is electrically connected to the positive external terminal 6, and the negative electrode tab 12 is electrically connected to the negative external terminal 7. Specifically, the positive electrode tab 11 is connected to a plate-shaped positive electrode current-collecting member 13 extending from the positive external terminal 6 along the top surface of the case 3 inside the case 3. The negative electrode tab 12 is connected to a plate-shaped negative electrode current-collecting member 14 extending from the negative external terminal 7 along the top surface of the case 3 inside the case 3.

The positive electrode plate 8 includes a conductive foil-shaped or sheet-shaped positive electrode substrate, and a positive active material layer laminated on each of both surfaces of the positive electrode substrate.

As the material of the positive electrode substrate of the positive electrode plate 8, a metal such as aluminum, copper, iron, and nickel or an alloy thereof is used. Among these, aluminum, an aluminum alloy, copper, and a copper alloy are preferable from the balance between high conductivity and cost, and aluminum and an aluminum alloy are more preferable. Examples of the positive electrode substrate include a foil and a vapor-deposited film, and a foil is preferable in terms of cost. That is, the positive electrode substrate is preferably an aluminum foil. Examples of aluminum or an aluminum alloy include A1085P and A3003P specified in JIS-H4000 (2014).

The positive active material layer of the positive electrode plate 8 is a porous layer formed of a so-called mixture containing a positive active material. The mixture for forming the positive active material layer contains optional components such as a conductive agent, a binding agent (binder), a thickener, and a filler, if necessary.

Examples of the positive active material include a composite oxide represented by $Li_xMO_y$ (M represents at least one transition metal) ($Li_xCoO_2$, $Li_xNiO_2$, $Li_xMn_2O_4$, $LixMnO_3$, $Li_xNi_\alpha Co_{(1-\alpha)}O_2$, $Li_xNi_\alpha Mn_\beta Co_{(i-\alpha-\beta)}O_2$, $Li_xNi_\alpha Mn_{(2-\alpha)}O_4$, and the like), and a polyanion compound represented by $Li_wMe_x(XO_y)_z$ (Me represents at least one transition metal, X represents, for example, P, Si, B, V or the like) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$, and the like.). Elements or polyanions in these compounds may be partially substituted with other elements or anionic species. In the positive active material layer, one type of these compounds may be used alone, or two or more types thereof may be used in mixture. The crystal structure of the positive active material is preferably a layered structure or a spinel structure.

The negative electrode plate 9 includes a conductive foil-shaped or sheet-shaped negative electrode substrate, and a porous negative active material layer laminated on both surfaces of the negative electrode substrate.

The material of the negative electrode substrate of the negative electrode plate 9 is preferably copper or a copper alloy. A preferred example of the negative electrode substrate is a foil. That is, the negative electrode substrate of the negative electrode plate 9 is preferably a copper foil. Examples of the copper foil used as the negative electrode substrate include a rolled copper foil and an electrolytic copper foil.

The negative active material layer is a porous layer formed of a so-called mixture containing a negative active material. The mixture for forming the negative active material layer contains optional components such as a conductive agent, a binding agent (binder), a thickener, and a filler, if necessary.

As the negative active material, a material capable of inserting and extracting lithium ions is suitably used. Specific examples of the negative active material include lithium, metals such as lithium alloys, metal oxides, polyphosphate compounds, and carbon materials such as graphite and amorphous carbon (easy graphitizable carbon or hardly graphitizable carbon).

Among the negative active materials, Si, Si oxide, Sn, Sn oxide, or a combination thereof is preferably used from the viewpoint of setting the discharge capacity per unit facing area between the positive electrode plate 8 and the negative electrode plate 9 in a suitable range, and Si oxide is particularly preferably used. Si and Sn can have a discharge capacity of about three times of that of graphite when converted to oxide.

The separator 10 is formed of a sheet-shaped or film-shaped material in which an electrolyte solution infiltrates. As the material for forming the separator 10, for example, a woven fabric, a nonwoven fabric or the like can be used, but typically, a porous sheet-shaped or film-shaped resin is used. The separator 10 separates the positive electrode plate 8 and the negative electrode plate 9, and holds an electrolyte solution between the positive electrode plate 8 and the negative electrode plate 9.

As the main component of the separator 10, for example, polyethylene (PE), polypropylene (PP), an ethylene-vinyl acetate copolymer, an ethylene-methyl acrylate copolymer, an ethylene-ethyl acrylate copolymer, polyolefin derivatives such as chlorinated polyethylene, polyolefins such as an ethylene-propylene copolymer, and polyesters such as polyethylene terephthalate and copolymerized polyester can be employed. Among these, as the main component of the separator 10, polyethylene and polypropylene, which are excellent in electrolyte solution resistance, durability, and weldability, are suitably used.

The separator 10 preferably includes a heat-resistant layer or an oxidation-resistant layer on both surfaces or one surface (preferably, a surface facing the positive electrode plate 8). The heat-resistant layer means a layer which prevents the breakage of the separator 10 due to heat to more reliably prevent a short-circuit between the positive electrode plate 8 and the negative electrode plate 9. Meanwhile, the oxidation-resistant layer means a layer which protects the separator under a high-voltage environment but does not impart sufficient heat resistance to the separator.

The heat-resistant layer or the oxidation-resistant layer of the separator 10 may be configured to contain a large number of inorganic particles and a binder connecting the inorganic particles.

Examples of the main components of the inorganic particles include oxides such as alumina, silica, zirconia, titania, magnesia, ceria, yttria, zinc oxide, and iron oxide, nitrides such as silicon nitride, titanium nitride, and boron nitride, silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, and magnesium silicate. Among these, the main component of the inorganic particles of the heat-resistant layer or the oxidation-resistant layer is particularly preferably alumina, silica, and titania.

The positive electrode tab 11 and the negative electrode tab 12 can be formed by extending the positive electrode substrate and the negative electrode substrate of the positive electrode plate 8 and the negative electrode plate 9 so as to protrude from a rectangular region in which the active material layer is laminated, respectively, in a strip shape.

The positive electrode tab 11 and the negative electrode tab 12 protrude from one side of the main body of the electrode assembly 2 so as not to overlap each other when viewed in a direction in which the positive electrode plate 8 and the negative electrode plate 9 are laminated (see FIG. 2). The positive electrode tab 11 and the negative electrode tab 12 extending from each of the positive electrode plates 8 and the negative electrode plates 9 are laminated and bundled, and respectively connected to the positive electrode current-collecting member 13 and the negative electrode current-collecting member 14.

The positive electrode tab 11 and the negative electrode tab 12 may be connected to portions of the positive electrode current-collecting member 13 and the negative electrode current-collecting member 14 extending substantially parallel to the top surface of the case 3 so as to avoid a connection structure between the positive external terminal 6 and the negative external terminal 7 of the positive electrode current-collecting member 13 and the negative electrode current-collecting member 14.

By using the plate-shaped positive electrode current-collecting member 13 and negative electrode current-collecting member 14 extending in parallel with the top surface of the case 3, a connection area between the positive electrode tab 11 and the negative electrode tab 12 is easily increased, whereby the electric resistances between the positive external terminal 6 and the negative external terminal 7, and the positive electrode tab 11 and the negative electrode tab 12 can be reduced.

The positive electrode current-collecting member 13 and the negative electrode current-collecting member 14 can be connected to the positive external terminal 6 and the negative external terminal 7, for example, by fixing the positive external terminal 6 and the negative external terminal 7 to the top surface of the case 3 by caulking or the like for flaring the end parts of the positive external terminal 6 and the negative external terminal 7 which pass through the positive electrode current-collecting member 13 and the negative electrode current-collecting member 14.

The positive electrode tab 11 and the negative electrode tab 12 can be connected to the positive electrode current-collecting member 13 and the negative electrode current-collecting member 14 by, for example, ultrasonic welding, laser welding, caulking, or the like.

The positive electrode current-collecting member 13 is preferably formed of the same type of metal as that of the positive electrode substrate, and the negative electrode current-collecting member 14 is preferably formed of the same type of metal as that of the negative electrode substrate.

As the electrolyte solution sealed in the case 3 together with the electrode assembly 2, a known electrolyte solution usually used for the energy storage device can be used. For example, a solution in which lithium hexafluorophosphate (LiPF$_6$) or the like is dissolved in a solvent containing a cyclic carbonate such as ethylene carbonate (EC), propylene carbonate (PC), or butylene carbonate (BC), or a chain carbonate such as diethyl carbonate (DEC), dimethyl carbonate (DMC), or ethyl methyl carbonate (EMC) can be used.

The case 3 holds the electrode assembly 2 immersed in the electrolyte solution, and protects the electrode assembly 2.

The case 3 preferably includes a bottomed cylindrical case body forming a bottom surface, a pair of short side surfaces, and a pair of long side surfaces, and a lid plate forming the top surface of the case 3 and sealing an opening of the case body. Thus, the strength of the case 3 can be improved by integrally forming the bottom surface, the pair of short side surfaces, and the pair of long side surfaces by the bottomed cylindrical case body. The top surface on which the external terminals 6 and 7 are provided is formed by a lid separate from the case body, whereby the energy storage device 1 can be easily assembled.

On the top surface of the case 3, a rupture valve 15 is provided between the positive external terminal 6 and the negative external terminal 7. This rupture valve 15 is not in a normal use state, but when the internal pressure of the case 3 rises to a pressure equal to or greater than a certain pressure, the rupture valve 15 is opened to form an opening, whereby the gas in the case 3 is released to the outside to decrease the pressure.

As the material of the case 3, for example, metals such as aluminum, an aluminum alloy, and stainless steel, and resins and the like can be used. The material of the case is preferably a metal.

The thickness of the top surface (lid plate) of the case 3 depends on the material and the size, but it may be, for example, 0.5 mm or more and 2.0 mm or less. Meanwhile, the thickness of the bottom surface of the case 3 may be, for example, 0.5 mm or more and 1.8 mm or less. The thicknesses of the pair of short side surfaces and the pair of long side surfaces of the case 3 may be, for example, 0.5 mm or more and 1.5 mm or less. The thicknesses of the bottom surface and the top surface of the case 3 are preferably larger than the thicknesses of the pair of short side surfaces and the pair of long side surfaces integrally formed in a rectangular cylindrical shape. The thickness of the top surface which is finally joined is more preferably larger than the thickness of the bottom surface which can be formed integrally with the pair of short side surfaces and the pair of long side surfaces.

The glass paper sheet 4 is a sheet composed of a glass fiber, and has a relatively low thermal conductivity due to the inclusion of air between the glass fibers. The glass paper sheet 4 covers the periphery of the case 3, whereby the amount of heat conducted from the case 3 to an object (for example, the energy storage device 1 disposed side by side) adjacent to the energy storage device 1 via the glass paper sheet 4 is suppressed.

The glass paper sheet 4 composed of a glass fiber is bendable, whereby the glass paper sheet 4 can be wound around the periphery of the case 3 to cover the case 3. For this reason, the energy storage device 1 is relatively easily manufactured.

The lower limit of the average thickness of the glass paper sheet 4 is preferably 0.2 mm, and more preferably 0.3 mm. Meanwhile, the upper limit of the average thickness of the glass paper sheet 4 is preferably 1.0 mm, and more preferably 0.8 mm. By setting the average thickness of the glass paper sheet 4 to a value equal to or greater than the lower limit, the glass paper sheet 4 has sufficient heat insulating properties. By setting the average thickness of the glass paper sheet 4 to be equal to or less than the upper limit, the volume occupied by the glass paper sheet 4 in the energy storage device 1 can be reduced, whereby the energy density can be improved.

The lower limit of the porosity (at normal pressure) of the glass paper sheet 4 is preferably 70%, and more preferably 80%. Meanwhile, the upper limit of the porosity of the glass paper sheet 4 is preferably 97%, and more preferably 95%. When the porosity of the glass paper sheet 4 is increased, the heat insulating properties are improved, but the tensile strength as the sheet is reduced to cause deteriorated manufacturing properties. Meanwhile, when the porosity of the glass paper sheet 4 is reduced, the tensile strength as the sheet is improved, but the heat insulating properties are deteriorated. By setting the porosity to a value equal to or greater than the lower limit, the glass paper sheet 4 has sufficient heat insulating properties and strength. When the porosity of the glass paper sheet 4 is equal to or less than the upper limit, the glass paper sheet 4 has sufficient strength. The "porosity" is a value obtained by calculating the volume per unit area of a glass paper sheet using a thickness measured by a thickness gauge, calculating the volume of the glass fiber per unit area of the glass paper sheet from the specific gravity of the glass fiber and the weight of the glass fiber used per unit area of the glass paper sheet, and calculating as the ratio of the difference between the volumes to the volume per unit area of the glass paper sheet.

The lower limit of the porosity of the glass paper sheet 4 under a pressure of 20 $N/cm^2$ applied to the energy storage device 1 is preferably 45%, and more preferably 50%. Meanwhile, the upper limit of the porosity of the glass paper sheet 4 under a pressure of 20 $N/cm^2$ applied to the energy storage device 1 is preferably 80%, and more preferably 75%. Normally, when the energy storage device 1 is assembled into the energy storage module, a pressure of, for example, about 20 $N/cm^2$ is applied so that the adjacent energy storage devices 1 compress each other. For this reason, by setting the porosity of the glass paper sheet 4 under a pressure of 20 $N/cm^2$ applied to the energy storage device 1 to a value equal to or greater than the lower limit, the glass paper sheet 4 has sufficient heat insulating properties. By setting the porosity of the glass paper sheet 4 under a pressure of 20 $N/cm^2$ applied to the energy storage device 1 to be equal to or less than the upper limit, the strength of the glass paper sheet 4 can be secured.

The lower limit of the average diameter of the glass fibers forming the glass paper sheet 4 is preferably 0.2 μm, and more preferably 0.3 μm. Meanwhile, the upper limit of the average diameter of the glass fibers forming the glass paper sheet 4 is preferably 1.5 μm, and more preferably 1.0 μm. By setting the average diameter of the glass fibers forming the glass paper sheet 4 to a value equal to or greater than the lower limit, the glass paper sheet 4 can have sufficient strength. The average diameter of the glass fibers forming the glass paper sheet 4 is equal to or less than the upper limit, whereby the glass paper sheet 4 can have sufficient heat insulating properties.

The glass paper sheet 4 can contain a binder. As the binder contained in the glass paper sheet 4, for example, polymer binders such as acrylic, polyester, polypropylene, and a fluorine resin, and inorganic binders such as sodium silicate can be used.

The glass paper sheet 4 can be bonded to the outer surface of the case 3 using an adhesive. The material and thickness of the adhesive are selected so that the adhesive does not penetrate deep into the glass paper sheet 4 at the time of bonding and when the energy storage device 1 generates heat. In order to facilitate the adhesion of the glass paper sheet 4 to the case 3, a multilayer sheet in which an inner resin film is laminated on the back surface (the surface facing the case 3) of the glass paper sheet 4 may be used. When the inner resin film is sufficiently thin, the inner resin film may be composed of, for example, polypropylene, polyphenylene sulfide, or the like, which melts when the energy storage device 1 generates heat. Alternatively, the inner resin film is composed of a material having sufficient heat resistance such as polyimide, which makes it possible to prevent the resin from penetrating into the glass paper sheet 4 when the energy storage device 1 generates heat, to increase the thermal conductivity.

The resin film 5 covers the surface of the glass paper sheet 4, to prevent the glass paper sheet 4 from being damaged by scratching or the like in the energy storage device 1, thereby improving the handleability of the energy storage device 1. The use of the laminated sheet in which the resin film 5 and the glass paper sheet 4 are integrated in advance makes it possible to easily handle the glass paper sheet 4 until the laminated sheet is bonded to the case 3 when the energy storage device 1 is manufactured.

Examples of the material of the resin film 5 include polypropylene, polyphenylene sulfide, and polyethylene terephthalate.

The lower limit of the average thickness of the resin film 5 is preferably 10 μm, and more preferably 15 μm. Meanwhile, the upper limit of the average thickness of the resin film 5 is preferably 100 μm, and more preferably 50 μm. By setting the average thickness of the resin film 5 to a value equal to or greater than the lower limit, the strength of the resin film 5 becomes sufficient, whereby the protection of the glass paper sheet 4 is secured. By setting the average thickness of the resin film 5 to be equal to or less than the upper limit, the energy storage device 1 can be prevented from becoming unnecessarily large.

The positive external terminal 6 and the negative external terminal 7 are disposed outside the top surface of the case 3, and include a plate-like terminal part to which a bus bar and a wiring are connected, and a shaft part extending from the terminal part and penetrating the top surface of the case 3. The positive external terminal 6 and the negative external terminal 7 are airtightly fixed to the case 3 with an insulating gasket interposed therebetween so as to prevent the leakage of the electrolyte solution without being brought into electrical contact with the case 3.

The rupture valve 15 functions in a peculiar situation which is not a normally foreseen use form. The rupture valve 15 forms an opening to release a gas in the case 3, thereby reducing the internal pressure when the internal pressure of the case 3 reaches a certain pressure. For example, an external force causes breakage of the electrode assembly 2 to cause an internal short-circuit of the electrode assembly 2, and the gas is generated in the case 3 by a short-circuit current.

The rupture valve 15 has a groove formed by partially reducing the plate thickness. When the internal pressure of the energy storage device 1 rises, the rupture valve 15 breaks along the groove to form a flap-shaped (tongue-shaped) portion, and the flap-shaped portion is flipped outward by the internal pressure to form the opening in the case.

As described above, the energy storage device 1 prevents the glass paper sheet 4 from conducting heat to an adjacent member even when a vehicle equipped with the energy storage device 1 generates heat, for example, at the time of the crash, and the rupture valve 15 reduces the internal pressure. Therefore, the chain of heat generation to other energy storage device 1 which is adjacently provided can be prevented.

Figure 4:
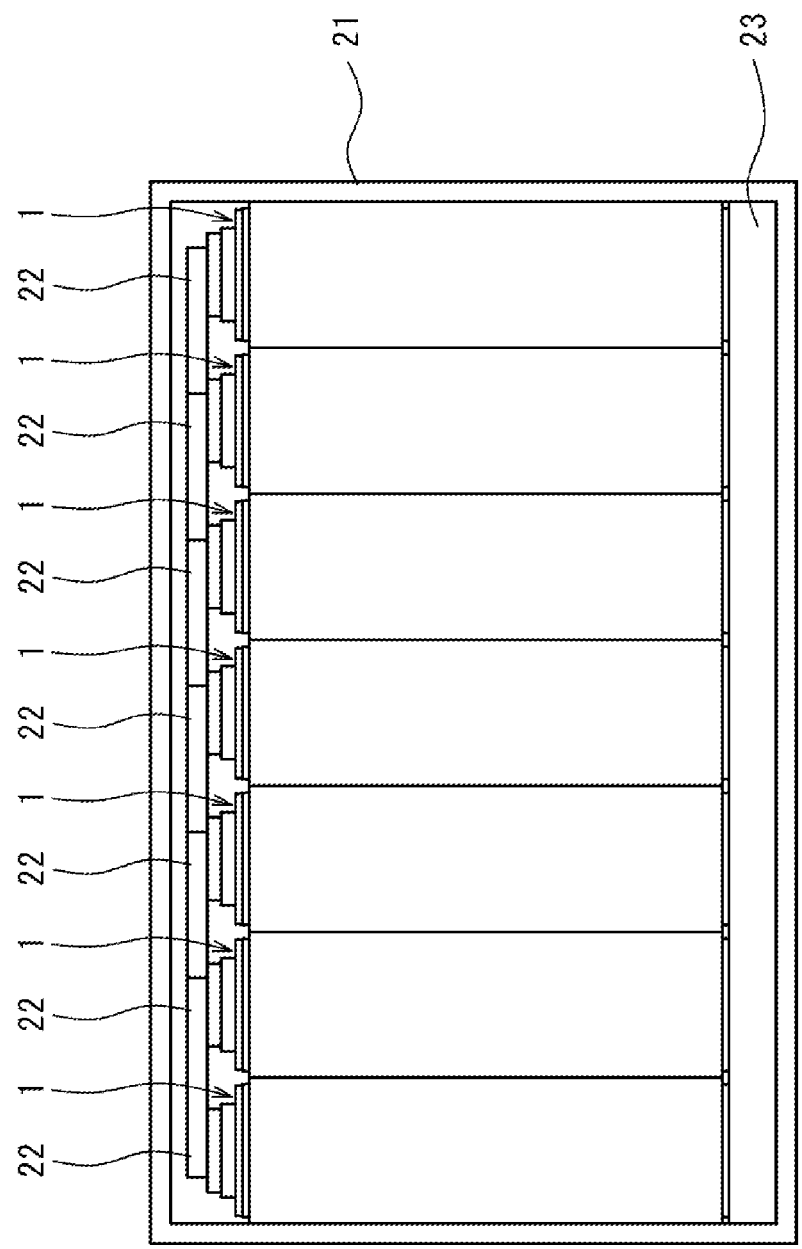
FIG. 4 is a schematic view of an energy storage module including the energy storage device of FIG. 1.

Next, FIG. 4 shows an energy storage module according to another embodiment of the present invention.

The energy storage module includes the plurality of energy storage devices 1, and a holding member 21 which holds the plurality of energy storage devices 1 side by side so that the glass paper sheet 4 faces the adjacent energy storage device 1. More specifically, in the energy storage module, the plurality of energy storage devices 1 are held side by side so that the long side surfaces of a case 3 face each other and resin films 5 are brought into close contact with each other.

The holding member 21 is formed of a rigid member so as to allow the plurality of energy storage devices 1 to be held, and is formed in a frame shape, a box shape, or the like, for example.

The energy storage module further includes a plurality of bus bars 22 attached to the positive external terminal 6 and the negative external terminal 7 so as to electrically connect the plurality of energy storage devices 1 in series.

The energy storage module further includes a plate-shaped cooling member 23 held by the holding member 21 and brought into close contact with the bottom surfaces of the plurality of energy storage devices 1. That is, in the energy storage module, the plurality of energy storage devices 1 are disposed side by side on the upper surface of the cooling member 23 horizontally disposed. In the energy storage device 1, the glass paper sheet 4 is not laminated on the bottom surface of the case 3, whereby the heat of the case 3, and thus the electrode assembly 2 and the electrolyte solution in the case 3 can be efficiently released to the cooling member 23.

The cooling member 23 may be a water-cooled type or an air-cooled type. From the viewpoint of improving the cooling effect, a water-cooled type (a type in which a liquid refrigerant passes) is preferable.

Furthermore, in order to prevent a void from being formed between the case 3 of the energy storage device 1 and the cooling member 23 to reduce the thermal conductivity, for example, a heat transfer member formed of a resin sheet, a gel sheet or the like may be provided between the energy storage device 1 and the cooling member 23.

In the energy storage module, even when any of energy storage devices 1 generates heat, for example, at the time of the crash of a vehicle equipped with the energy storage devices 1, the glass paper sheet 4 can prevent the heat of the energy storage device 1 from being conducted to the adjacent energy storage device 1. This makes it possible to prevent the adjacent energy storage device from generating heat in a chain reaction.

Other Embodiment

The above embodiment does not limit the present invention. In the above embodiment, components of each part of the embodiment can be omitted, replaced, or added based on the description of the present specification and the common technical knowledge, and all of them should be interpreted as belonging to the scope of the present invention.

In the energy storage device, the glass paper sheet may be brought into contact with at least one outer surface of the case. For example, the glass paper sheet may be disposed only on a pair of long side surfaces, or on three surfaces of a pair of long side surfaces and one surface on a short side.

The energy storage device may include an external electrode provided on the short side surface of the case. In this case, the glass paper sheet may be provided on the pair of long side surfaces and the top surface of the case.

The energy storage device may not include a resin film.

The energy storage module may include no cooling member, or may include a cooling member in contact with the side surface of the energy storage device.

The energy storage module may include a plurality of energy storage devices 1 each including a glass paper sheet 4, or a glass paper sheet may be provided between a plurality of energy storage devices each including no glass paper sheet. The glass paper sheet is brought into contact with the case of the adjacent energy storage device. The glass paper sheet may include the above-described resin film.

INDUSTRIAL APPLICABILITY

The energy storage module and the energy storage device according to the present invention can be particularly suitably utilized as a power source for a vehicle.

DESCRIPTION OF REFERENCE SIGNS

1 energy storage device
2 electrode assembly
3 case
4 glass paper sheet
5 resin film
6 positive external terminal
7 negative external terminal
8 positive electrode plate
9 negative electrode plate
10 separator
11 positive electrode tab
12 negative electrode tab
13 positive electrode current-collecting member
14 negative electrode current-collecting member
15 rupture valve
21 holding member
22 bus bar
23 cooling member

The invention claimed is:

1. An energy storage module comprising:
   a plurality of energy storage devices each including a case;
   a glass paper sheet provided between energy storage devices of the plurality of energy storage devices, brought into contact with the case, and mainly composed of a glass fiber; and
   a holding member holding the plurality of energy storage devices and the glass paper sheet,
   wherein the glass paper sheet is compressed between the energy storage devices,
   wherein the glass paper sheet has a porosity of 70% or more and 97% or less, and
   wherein the glass paper sheet has a porosity of 45% or more and 80% or less under a pressure of 20 N/cm$^2$ applied to an energy storage device of the plurality of energy storage devices.

2. The energy storage module according to claim 1, wherein:
   the case has a short side surface and a long side surface which is orthogonal to the short side surface and has an area larger than that of the short side surface; and
   the glass paper sheet is brought into contact with at least the long side surface.

3. The energy storage module according to claim 2, wherein the glass paper sheet covers the case over the short side surface and the long side surface.

4. The energy storage module according to claim 1, wherein the glass paper sheet has an average thickness of 0.2 mm or more and 1.0 mm or less.

5. The energy storage module according to claim 1, wherein the glass paper sheet has a porosity of 70% or more and 95% or less.

6. The energy storage module according to claim 1, wherein the glass paper sheet is formed by glass fibers with the average diameter of 0.2 μm or more and 1.5 μm or less.

7. An energy storage module comprising:
a plurality of energy storage devices each including a case;
a glass paper sheet provided between energy storage devices of the plurality of energy storage devices, brought into contact with the case, and mainly composed of a glass fiber; and
a holding member holding the plurality of energy storage devices and the glass paper sheet,
wherein the glass paper sheet is compressed between the energy storage devices,
wherein the glass paper sheet has a porosity of 70% or more and 97% or less, further comprising a resin film brought into contact with the glass paper sheet, and
wherein the glass paper sheet has a porosity of 45% or more and 80% or less under a pressure of 20 N/cm$^2$ applied to an energy storage device of the plurality of energy storage devices.

8. The energy storage module according to claim 7, wherein the resin film includes polypropylene, polyphenylene sulfide, or polyethylene terephthalate.

9. The energy storage module according to claim 7, wherein an average thickness of the resin film is 10 μm or more.

10. The energy storage module according to claim 7, wherein the glass paper sheet has a porosity of 80% or more and 95% or less.

11. The energy storage module according to claim 7, wherein the glass paper sheet is formed by glass fibers with the average diameter of 0.2 μm or more and 1.5 μm or less.

12. An energy storage device comprising:
a case; and
a glass paper sheet brought into contact with the case and mainly composed of a glass fiber,
wherein the glass paper sheet has a porosity of 70% or more and 97% or less, and
wherein the glass paper sheet has a porosity of 45% or more and 80% or less under a pressure of 20 N/cm$^2$ applied to an energy storage device of a plurality of energy storage devices.

13. The energy storage device according to claim 12, wherein the glass paper sheet has a porosity of 80% or more and 95% or less.

14. The energy storage device according to claim 12, wherein the glass paper sheet is formed by glass fibers with the average diameter of 0.2 μm or more and 1.5 μm or less.

\* \* \* \* \*